United States Patent
Finch et al.

(10) Patent No.: US 9,193,867 B2
(45) Date of Patent: Nov. 24, 2015

(54) AQUEOUS AMINE-CARBOHYDRATE THERMOSETS HAVING REDUCED WEIGHT LOSS UPON CURE AND IMPROVED EARLY DRY STRENGTH

(71) Applicant: Rohm and Haas Company, Philadelphia, PA (US)

(72) Inventors: William Christopher Finch, Ambler, PA (US); Haksu Lee, Ambler, PA (US); Charles J. Rand, Philadelphia, PA (US); C. Damien Rodowski, Downingtown, PA (US); Barry Weinstein, Dresher, PA (US)

(*) Notice: Subject to any disclaimer, the term of this patent is extended or adjusted under 35 U.S.C. 154(b) by 0 days.

(21) Appl. No.: 13/901,627

(22) Filed: May 24, 2013

(65) Prior Publication Data
US 2013/0323492 A1 Dec. 5, 2013

Related U.S. Application Data

(60) Provisional application No. 61/652,546, filed on May 29, 2012.

(51) Int. Cl.
*C08L 79/02* (2006.01)
*C09J 103/02* (2006.01)
*C08L 3/02* (2006.01)

(52) U.S. Cl.
CPC . *C08L 79/02* (2013.01); *C08L 3/02* (2013.01); *C09J 103/02* (2013.01); *Y10T 428/249921* (2015.04)

(58) Field of Classification Search
CPC ........... C08L 39/00; C08L 39/02; C08L 3/02; C08L 89/00; C08L 89/005; C08L 79/02; C08K 5/17; C08K 5/1545
USPC .................. 524/48, 800; 428/221; 427/385.5
See application file for complete search history.

(56) References Cited

U.S. PATENT DOCUMENTS

| | | |
|---|---|---|
| 5,895,804 A | 4/1999 | Lee et al. |
| 6,136,916 A | 10/2000 | Arkens et al. |
| 6,699,945 B1 | 3/2004 | Chen et al. |
| 7,026,390 B2 | 4/2006 | O'Brien-Bernini et al. |
| 7,854,980 B2 | 12/2010 | Jackson et al. |
| 8,232,334 B2 | 7/2012 | Kelly et al. |
| 2005/0215153 A1 | 9/2005 | Cossement et al. |
| 2007/0027283 A1 | 2/2007 | Swift et al. |
| 2009/0170978 A1 | 7/2009 | Kelly |
| 2011/0021101 A1 | 1/2011 | Hawkins et al. |
| 2011/0086567 A1 | 4/2011 | Hawkins et al. |

FOREIGN PATENT DOCUMENTS

| | | |
|---|---|---|
| CN | 101864090 A | 10/2010 |
| EP | 1892273 A2 | 2/2008 |
| EP | 2386605 A1 | 11/2011 |
| EP | 2457943 A1 | 5/2012 |
| WO | 2011/044490 A1 | 4/2011 |
| WO | WO 2011138458 A1 * | 11/2011 |
| WO | WO 2011138459 A1 * | 11/2011 |
| WO | 2012/037451 A2 | 3/2012 |
| WO | 2012/047236 A1 | 4/2012 |
| WO | WO 2012152731 A1 * | 11/2012 |

OTHER PUBLICATIONS

BeMiller, J. N., "Starch" in Ullmann's Encyclopedia of Industrial Chemistry, published online Feb. 2011, vol. 34, pp. 113-141.*

* cited by examiner

*Primary Examiner* — Liam J Heincer
*Assistant Examiner* — Nicholas Hill
(74) *Attorney, Agent, or Firm* — Andrew E. C. Merriam

(57) ABSTRACT

The present invention provides thermosetting aqueous binder compositions comprising one or more reducing sugar, one or more diprimary diamine or poly(primary amine), and from 7 to 45 wt. %, based on total solids, of one or more polysaccharide having a dextrose equivalent (DE) value of from 5 to 30. The compositions provide treated articles, such as fiberglass mat. The binders provide articles having a dramatically reduced binder weight loss upon cure and a reduction in cure energy needed to achieve early dry strength.

10 Claims, No Drawings

AQUEOUS AMINE-CARBOHYDRATE THERMOSETS HAVING REDUCED WEIGHT LOSS UPON CURE AND IMPROVED EARLY DRY STRENGTH

The present invention relates to aqueous binder compositions comprising one or more reducing sugar one or more diprimary diamine or poly(primary amine) and a polysaccharide, such as a maltodextrin, uses thereof as curable binders for a variety of finely divided substrate materials, as well as wovens and non-wovens, and the cured binder treated products made therefrom.

Due to their favorable cost/performance, the thermosetting binder resins of choice in the past have been phenol/formaldehyde or urea/formaldehyde resins. Applications for formaldehyde resins are extensive, particularly in mineral and glass fiber binding. However, to avoid the toxicity and environmental issues posed by formaldehyde containing resins, there have been several commercial formaldehyde-free binders that most commonly contain a polycarboxylic acid polymer and a polyol that esterify and form a thermoset when heat cured. All of these binders are known to be derived primarily from petroleum feed stocks which are dwindling and experiencing wide price fluctuations and that contribute to atmospheric carbon dioxide. More recent formaldehyde free binders have been made from sustainable materials that are not derived from petroleum feeds.

WIPO Patent Publication no. WO 2012/037451A, to Mueller et al discloses formaldehyde free binder compositions that form melanoidins from the condensation of amines or ammonia with carbohydrates as thermosets, which binders are catalyzed by organic sulfur or phosphorus containing acids, and wherein the carbohydrates include polysaccharides having a degree of polymerization of 3-10, such as molasses and hydrolyzed celluloses or starches. The compositions aim to provide less corrosive binders in use. However, the compositions when used as binders including only polysaccharides and not primarily reducing sugars are likely not to form a thermoset. Such binders would thus provide cured products with inadequate tensile strength and water resistance. In addition, even when reducing sugars are included, large proportions of the binder compositions are lost in use as water, ammonia or volatile amine and carbon dioxide vapor. For example, weight loss in dextrose/polyamine binder compositions systems is significant at 35% weight loss for an 80/20 w/w formulation. This weight loss in use represents lost binder and is an increased cost to the end user.

The present inventors have sought to provide a formaldehyde free binder to solve the problem of providing renewable source thermosetting binders that meet the need for a water resistant formaldehyde-free, thermoset binder of which more is retained on the substrate in the curing process and thus which have a lower weight loss upon cure.

STATEMENT OF THE INVENTION

1. In accordance with the present invention, aqueous thermosetting binder compositions comprise i) one or more reducing sugar, such as dextrose, ii) one or more diprimary diamine or poly(primary amine), wherein the weight ratio of the total diprimary diamine or poly(primary amine) solids to total reducing sugar solids ranges from 1.2:1 to 0.12:1, preferably, from 0.5:1 to 0.05:1; iii) from 7 to 45 wt. %, based on total solids, preferably, from 10 to 30 wt. % one or more polysaccharide having a dextrose equivalent (DE) value of 5 to 30, preferably 7 or more, or, more preferably, from 10 to 23, for example, maltodextrins having the desired DE value.

2. The compositions of the present invention in 1, above, may further comprise up to 20 wt. %, or, preferably, up to 10 wt. %, of one or more stabilizer, such as a stabilizer acid or salt having a pKa of 8.5 or less, preferably 7.5 or less, for example, ammonium salts of inorganic acids, like ammonium phosphate, diammonium phosphate (DAP) or ammonium sulfate (AS).

3. The compositions of the present invention in 1 or 2, above, may further comprise up to 6 wt. %, or, preferably, up to 4 wt. %, of one or more fire retardant, such as, phosphorous containing salts or an organic bromine compound, such as, for example, decabromodiphenyl oxide/antimony trioxide.

4. In any of the compositions of 1 to 3, above, the one or more reducing sugar is, preferably, a 5-carbon or a 6-carbon monosaccharide.

5. In another aspect of the present invention, methods of using any of the aqueous thermosetting binder compositions 1 to 4, above, comprise applying the binder compositions to or mixing them with a substrate and then heating the thus treated substrates or mixtures to cure the binder, for example, at from 100 to 400° C. Suitable substrates may include fibers, slivers, chips, particles, films, sheets, and combinations thereof. Suitable substrate materials may include, for example, glass, glass fiber, stone, stone fibers, composites and composite fibers or of organic and inorganic substrates, wood, or woody materials.

6. In another aspect, the present invention comprises a treated substrate, for example, a fiber matt, containing a cured binder resulting from applying the compositions of any of 1 to 4 thereto. Preferably, the density of the fiber matt is from 5 to 220 (kg/m$^3$).

As used herein, the phrase "alkyl" means any aliphatic alkyl group having one or more carbon atoms, the alkyl group including n—alkyl, s—alkyl, i—alkyl, t—alkyl groups or cyclic aliphatics containing one or more 5, 6 or seven member ring structures.

As used herein, the phrase "aqueous" or includes water and mixtures composed substantially of water and water-miscible solvents.

As used herein, the phrase "based on the total solids" refers to weight amounts of any given ingredient in comparison to the total weight amount of all of the non-volatile ingredients in the binder (e.g. reducing sugar(s), polysaccharide(s), primary amine(s), stabilizers, silanes & tc).

As used herein, the phrase "DE" or "dextrose equivalent" refers to the "reducing sugar content expressed as dextrose percentage on dry matter" and is used to characterize the molecular weight of polysaccharides. See *Handbook of Starch Hydrolysis Products and Their Derivatives* (Page 86, 1995 By M. W. Kearsley, S. Z. Dziedzic Its theoretical value which is inversely proportional to number average molecular weight (Mn), is calculated as DE=Mglucose/Mn×100 or 180/Mn×100. See Rong Y, Sillick M, Gregson C M. "Determination Of Dextrose Equivalent Value And Number Average Molecular Weight Of Maltodextrin By Osmometry", *J Food Sci*. 2009 January-Feburary; 74(1), pp. C33-040. For example, dextrose has a DE of 100 while pure starch (e.g. corn) has a DE value of 0.)

As used herein the "pKa" of a stabilizer will be treated as the pKa of the most acidic proton of an acid stabilizer or the lowest pKa of the acid or salt stabilizer, i.e. the pKa of the strongest proton or base conjugate is understood.

As used herein, the term "poly(primary amine)" means any compound having three or more primary amine groups.

As used herein, the phrase "substantially formaldehyde-free" refers to compositions free from added formaldehyde, and which do not liberate substantial formaldehyde as a result of drying and/or curing. Preferably, such binder or material that incorporates the binder liberates less than 100 ppm of formaldehyde, more preferably less than 25 and most preferably less than 5 ppm of formaldehyde, as a result of drying and/or curing the binder.

As used herein, "wt. %" or "wt. percent" means weight percent based on solids.

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(poly)saccharide" encompasses, in the alternative, a saccharide, or polysaccharide, or mixtures thereof.

The endpoints of all ranges directed to the same component or property are inclusive of the endpoint and independently combinable. Thus, for example, a disclosed range of a dextrose equivalent (DE) value of 5 to 30, preferably 7 or more, or, more preferably, from 10 to 23 includes any of a DE of from 5 to 30, from 7 to 30, from 5 to 23, from 5 to 10, from 7 to 10, from 7 to 23, from 10 to 23, from 5 to 7, from 10 to 30 and from 23 to 30.

Unless otherwise indicated, conditions of temperature and pressure are room temperature (~20-22° C.) and standard pressure, also referred to as "ambient conditions". The aqueous binder compositions may be dried under conditions other than ambient conditions.

The aqueous binder composition of the present invention comprises largely renewable materials from natural sources, such as vegetable feedstocks. The early cure strength and the proportion of binder remaining after cure are both improved through the use of the aqueous binder compositions of the present invention. The aqueous thermosetting binder compositions of the present invention thus have a have a lower binder weight loss upon cure and so have a lower cost in use for binder applicators. In addition, as shown by the rapid development of physical properties during cure, the aqueous binder compositions exhibit a lower energy cost to achieve early dry strength when compared to binders from other natural or renewable feedstocks.

For each aqueous binder composition described herein, there exists an accompanying embodiment in which the aqueous composition is a binder composition and in which the composition is present in a composite material or product. As defined herein, the term "composite material" refers to materials comprising: (a) a substrate material selected from fibers, slivers, chips, particles, films, sheets, and combinations thereof; and (b) the binder composition of the described embodiment.

The present invention provides aqueous binder compositions comprising a total solids of from 5 to 95 wt. %, preferably, 4 wt. % or more, or, preferably, 60 wt. % or less, or, more preferably, 30 to 50 wt. %, based on the total weight of the aqueous binder.

The aqueous thermosetting binder composition comprises a polysaccharide having a DE of from 5 to 30, such as a maltodextrin, a dextrin, gums or gellans, high fractions of corn syrups, or hydrolyzed starch or maltodextrin which has the desired DE value. A lower DE polysaccharide is preferable from a binder weight loss upon cure point of view. However, a DE of less than 5 can lead the formation of precipitates in the binder solution, thus impairing storage stability; preferably, if the DE of the polysaccharide is 7 or less, it is used in the form of an aqueous dispersion mixture comprising less than 35 wt. % of the polysaccharide. Polysaccharides having a DE between 7 and 10 tend to be more soluble than those having DE less than 7 but are less desirable than those polysaccharides of DE greater than 10 because of the need to avoid precipitation. Polysaccharides having a DE of 10 or greater can be used to provide binders having shelf stability greater than 60 days. Preferably, suitable polysaccharides have a DE ranging from 7 to 23, or, more preferably, from 10 to 23.

Suitable polysaccharides may include, for example, Clintose™ CR 10, 15, and 18 DE maltodextrins, (ADM, Decatur, Ill.), Corn Syrup 26/42 (DE 26) (ADM Decatur, Ill.), STAR-DRI™ 5 (DE),10 (DE), and 20 (DE) maltodextrins (Tate & Lyle, Decatur, Ill.).

Suitable amounts of the polysaccharide in the aqueous thermosetting binder compositions of the present invention may range from 7 to 45 wt. %, based on total solids, preferably, from 10 to 30 wt. %. Above 50 wt. % of polysaccharides, the mechanical properties of products made with the binders may start to decrease.

The aqueous binder composition of the present invention comprises at least one reducing sugar, which may be a monosaccharide or di-saccharide. A reducing sugar herein is any sugar that has an aldehyde or a ketone in its open chain form. This allows the sugar to act as a reducing agent, for example in a reaction with an amine. A sugar may be a reducing sugar when its anomeric carbon (the carbon linked to two oxygen atoms) is in the free form. Sugars may occur in a chain as well as a ring structure and it is possible to have an equilibrium between these two forms. Further, some keto sugars are reducing sugars because they may be converted to an aldehyde via a series of tautomeric shifts to migrate the carbonyl to the end of the chain. This pathway could become accessible during the thermal curing process.

Reducing sugars include all monsaccharides, whether aldose (containing an aldehyde) or ketose (containing a ketone). Reducing sugars include glucose, fructose, glyceraldehydes, lactose, arabinose and maltose. Accordingly, the reducing sugar component of the present invention may be a monosaccharide in its aldose or ketose form, including a triose, a tetrose, a pentose, a hexose, or a heptose. Glyceraldehyde and dihydroxyacetone are considered to be aldose and ketose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Most disaccharides are also reducing sugars. Other natural or synthetic stereoisomers or optical isomers of reducing sugars may also be useful as the reducing sugar component of the aqueous binder composition; for example, dextrose, which is one of the optical isomers of glucose. The reducing sugar component of the aqueous binder composition optionally may be substituted, for example with hydroxy, halo, alkyl, alkoxy, or other substituent groups; for example, dihydroxyacetone is a suitable keto substituted ketose. In addition, the reducing sugar can comprise a dehydrated form of a reducing mono- or di-saccharide, such as, hydroxymethyl furfural from dehyrdrogenated glucose.

The reducing sugars optionally may be substituted, for example, with hydroxy, halo, alkyl, alkoxy, carbonyl or other substituent groups.

Suitable reducing sugars may include, for example, fructose, glyceraldehydes, lactose, arabinose, maltose, glucose, dextrose and levulose. Further, a number of suitable reducing sugar sources may be used, such as corn syrup, high fructose corn syrup, and other fructose and dextrose equivalents.

In one embodiment, the reducing sugar component comprises a high dextrose content syrup, e.g. having a greater than 30 wt. % dextrose. In such syrups, the higher the dextrose content, the better; syrups with greater than 95%, dextrose content are commercially available, for example ADM 97/71 corn syrup, from Archer Daniels Midland Company (Decatur, Ill., USA).

Suitable primary di-amines and polyprimary polyamines may include, for example, alkyl diprimary or higher primary diamines, such as aliphatic primary diamines, such as aminoguanidine and its salts, e.g. aminoguanidine hydrochloride, putrescine, n-alkylenediamines, like ethylene diamine, hexamethylene diamines, and other alkylene di-amines; cycloaliphatic primary diamines, such as, for example, di-aminoethylpiperazine; primary amine functional amino acids, such as lysine and aminoglycine; and aromatic di-primary amines, such as, for example, bis-(aminomethyl) cyclohexane (bisAMC), m-xylenediamine (MXD); polyamine polymers of the desired molecular weight, such as polyethyleneimines, polyethylenimine containing copolymers and block copolymers having 10 wt. % or more of primary amine groups, (co)polymers of n-aminoalkyl (meth) acrylates, such as aminoethyl methacrylate, polyguanidines, and any other (co)polymer which has at least 10 wt. %, preferably 20 wt. %, of primary amine groups.

Suitably, in the aqueous thermosetting binder composition the total number of equivalents of primary amine relative to the total number of equivalents of carbonyl (as aldehyde or ketone) groups in the reducing sugar should range from 0.3:1 or higher and up to 2:1, preferably 0.6:1 or higher, or, preferably, 0.8:1 or higher, or 1.0:1 or higher. A 2:1 equivalent ratio of primary amine to carbonyl in the reducing sugar equates to 50 mole % of di-primary diamine per one mole of a reducing sugar having one carbonyl group, e.g. dextrose.

The aqueous thermosetting binder composition of the present invention may further comprise one or more capping agent, such as a titanate, zirconate or aluminate, for example titanium lactate. Such capping agents may be used in the amount of from 1.0 to 5 wt. %, based on the total binder solids. Capping agents useful in the present invention may include, for example, titanates and zirconates such as organic titanates and zirconates sold by DuPont under the Trade name Tyzor, for example, water soluble Tyzors, such as, Tyzor™ LA, Tyzor™ 131, Tyzor™ 217, and Tyzor™ 218; dibutyltin dilaurate, other organo-tin salts, such as tin(IV) alkoxylates; mono- and di-carboxylate salts of aluminum or magnesium, and capping agents having the formula $MX_n$, wherein M is a metal, X is an organic acid, keto-acid, e.g., gluconic acid, reducing sugar or alkoxy(alkyl) group, and n is an integer of from 1 to 5, such as iron (II) $(gluconate)_2$. The capping agent may be chosen from, for example, the citrates, lactates, and gluconates of zinc, aluminum, zirconium, iron, magnesium, tin, titanium and boron; and their mixed metal salts; organo-tin compounds or salts; and titanates or zirconates of alcohols or carboxylic acids. A combination of capping agents may also be used. Preferably, the capping agent is water soluble, which means it has a solubility in water of greater than 1 gram per liter.

Preferably for flexible binders, the aqueous composition further comprises an emulsion polymer. Suitable emulsion polymers may comprise acrylic emulsions having, as polymerized units up to 30 wt. % polymerized acid comonomers, preferably from 1 to 20 wt. %, or, preferably, from 10 to 18 wt. %, based on the total weight of copolymerized monomers, hydrophobic emulsion polymers comprising greater than 30% by weight, based on the weight of the emulsion polymer solids, ethylenically-unsaturated acrylic monomer containing a $C_2$ or greater alkyl group, and acrylic or styrene acrylic emulsion polymers. Suitable acid comononers used to make the emulsion polymers may include, for example, methacrylic acid, acrylic acid, fumaric acid, maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. (Meth)acrylic acid is the preferred carboxy acid co-monomer.

The emulsion polymers may be present in the composition in an amount of 1% or more, or, 5% or more, or, up to 50%, or 30% by weight, based on the total solids.

The aqueous binder compositions of the present invention may further comprise other additives known in the art including, but not limited to, polymeric polyacid aqueous solution polymers such as polyacrylic acid; surfactants to help flow (silicones, fatty acids); biocides; corrosion inhibitors or passivators for metal surfaces, such as, for example, triazole and phosphate compounds, tin oxalates, thioureas, oxalates, chromates, and pH adjustors; lubricants; de-dusting oils, such as, for example, mineral oils; anti-foaming agents such as dimethicones, silicon-polymer (polysiloxane) oils and ethoxylated nonionics; and flame retardants like a bromide flame retardant (decabromodiphenyl oxide/antimony trioxide), such as GL-675 (Dow Chemical, Midland, Mich.).

In yet still another embodiment, the aqueous binder compositions can further comprise coupling agents such as organosilanes, particularly 3-aminopropylsilanes, such as Silquest™ A-187 silanes (manufactured by GE Silicones-OSi Specialties, located in Wilton Conn.); other amino silanes such as 3-aminopropyl dialkoxysilanes and 3-(2-aminoethyl)aminopropylsilanes; epoxy silanes such as glycidoxypropylsilanes, vinyl silanes and hydrophobic silanes. Suitable amounts of such organosilanes may range 1 wt. % or more, or, preferably up to 5 wt. %, based on the total solids.

To minimize the formaldehyde content of the aqueous composition, it is preferred, when preparing a polymer-containing formaldehyde-free curable composition, to use polymerization adjuncts and additives such as, for example, initiators, reducing agents, chain transfer agents, curing agents, biocides, surfactants, emulsifiers, coupling agents, anti-foaming agents, dust suppressing agents, fillers and the like, which are themselves formaldehyde free, or do not contain or generate formaldehyde during binder formation, application or cure.

The present invention provides methods of using the binder comprising applying the binder to a substrate and drying and/or curing. In drying (if applied in aqueous form) and curing the curable compositions, the duration, and temperature of heating, will affect the rate of drying, ease of processing or handling, and property development of the treated substrate. Suitable heat treatment temperatures may range 100° C. or more, and up to 400° C. The preferred treatment is substrate dependant. Thermally sensitive substrates such as cellulose fibers may be treated at 130 to 175° C. while thermally less sensitive composites may be treated at 150 to 200° C. and thermally resistant substrates such as mineral fibers may be treated at 220 to 300° C. for the desired times necessary to effect cure. Preferably, heat treatment temperatures range 150° C. or higher; such preferred heat treatment temperatures may range up to 225° C., or, more preferably, up to 200° C. or, up to 150° C. In the methods of use, the composition components need not all be pre-mixed prior to application of the binder to the substrate. For example, one or more components may be applied to a non-woven substrate, followed by application of the other binder components of this invention either in aqueous or dried form. After application, the binder can be cured by heating the coated non-woven to a sufficient temperature where it cures on the substrate.

The binder can be applied to the substrate, such as, for example, a web of fibers, by any suitable means including, for example, air or airless spraying, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

The present invention includes methods for treating a mat made from a web of fibers, and preferably transferred to a moving screen running through a binder application station where the aqueous binder of the invention is applied to the mat.

In applying binder, the binder add on level in substrate can range from 5 wt. % or more, or 10 wt. % or more, or up to 35 wt. percent of the finished substrate, preferably 12 wt. % or more, or, most preferably 15 to 25 wt. %, based on the total weight of the treated dry substrate, prior to cure.

Drying and curing can be done in two or more distinct steps, if desired. For example, the curable composition can be first heated at temperatures and for times sufficient to at least partially dry, but not fully cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

Suitable substrates for binder application may include, for example, textiles, including cotton, linen, wool, and synthetic textiles from polyester, rayon, or nylon, and superabsorbent fibers; vegetable or cellulosic fibers, such as jute, sisal, flax, cotton and animal fibers; as well as heat resistant substrates, such as metal; plastics; synthetic fibers, e.g. polyester, rayon, poly(acrylonitrile) (PAN), poly(lactic acid) (PLA), poly(caprolactone) (PCL), aramid fibers, polyimide fibers, polyolefins and bi-component fiber comprising two or more fiber-forming polymers such as polypropylene and polyethylene terephthalate; mineral fibers, such as glass and mineral fibers, slag or stonewool, ceramic fibers, metal fibers, carbon fibers, and woven and non-woven fabrics made therefrom; and heat-sensitive substrates, such as wood, including, solid wood, wood particles, fibers, chips, flour, pulp, and flakes; paper and cardboard.

The binders of this invention may preferably be used to treat non-woven webs. "Non-woven web(s)" refers to any article or sheet-like form made from natural and/or synthetic fibers wherein the fibers are aligned in a random or semi-random order (i.e., not deliberately ordered) whether by mechanical means such as, for example, by entanglement caused by needle-punching, spunbonding, spunlace webs, meltblown webs, air-laid (dry laid) process, and by a wet-laid process; and/or by chemical means such as, for example, treatment with a polymeric binder; or by a combination thereof. Mineral fibers may be in the form of a web, i.e. blown into a forming chamber, sprayed with a binder, and deposited as a web on to a conveyor. Some ordering of fibers occurs during any web forming process (primarily in the machine direction). Included in the definition of non-woven webs suitable for use with this invention are porous films prepared by the action of chemical or mechanical processing (e.g., apertured films).

The binder treated products may comprise non-wovens, such as, for example, a heat-resistant non-woven. Heat resistant non-wovens may also contain fibers which are not in themselves heat-resistant such as, for example, polyester fibers, rayon fibers, nylon fibers, and superabsorbent fibers, in so far as or in amounts such that they do not materially adversely affect the performance of the substrate.

Some suitable heat resistant non-wovens are used at temperatures higher than ambient temperature such as, for example, glass fiber-containing non-woven fabrics which are impregnated with a hot asphaltic composition pursuant to making roofing shingles or roll roofing material.

Some suitable uses for the binder of the present invention include, for example, making non-structural composites and laminates for indoor furniture, trim and molding; and the wet end formation and dry end treating or coating of paper, paperboard and cardboard, such as filter media; and the making and treating of woven and non-woven fabrics, such as, for example, fiberglass and stonewool insulation batting, polyester and spunbonded roof shingles, underlayment and scrim, and gypsum board facings, and filter media, such as air and oil filters.

EXAMPLES

The following examples serve to better illustrate the invention, which is not intended to be limited by the examples.

Formulations and Testing Applications

Aqueous thermosetting binder compositions were prepared by admixing vigorously the components of each formulation in water to provide approximately 150 g of an aqueous binder at 15 wt. % solids.

The compositions shown in Tables 1 and 2, below, were prepared by admixing components of each formulation at 30% solids comprising, based on total solids, 60 wt. % dextrose 20 wt. % hexamethylene diamine (HMDA, 60% solution, Thermo Fisher Scientific, Waltham Mass.) and the indicated wt. % of a polysaccharide of varying DE values 10 (maltodextrin, Spectrum Chemicals New Brunswick, N.J. Lot #2AK0418, DE 10.5), 26 (corn syrup, ADM Decatur, Ill.), 43 (corn syrup, ADM Decatur, Ill.), 63 (corn syrup, ADM Decatur, Ill.) and ~100 (dextrose, Thermo Fisher Scientific, Waltham Mass.). Also included was a formulation of 80 wt. % maltodextrin (DE value 10) with 20 weight % HMDA with no dextrose. The compositions thus prepared were then diluted to the 15 wt. % solids for application.

Binder impregnated microfiber filter paper (Whatman International Inc., Maidstone, England, GF/A, catalog No. 1820 866), in 20.3 cm×25.4 cm sheets was prepared by mechanically drawing a filter sheet through a trough filled with 120 grams of a 15 wt. % pre-mixed aqueous binder that has been further mixed by agitation, then sandwiching the soaked sample between two cardboard sheets to absorb excess binder, and pressing between the two cardboard sheets in a Birch Bros. Padder (Birch Brothers Inc., Waxham, N.C.), set at a pressure of 68.9476 kPa, and a speed 5 m/min. The resulting samples were dried @ 90° C. for 90 seconds in a Mathis Oven (Werner Mathis AG Niederhasli/Zurich, Switzerland) that is vented or equipped with a devotalizer. The dried sheets were then cured at 170° C. for 60 seconds and 180 seconds in the same type of Mathis oven used to dry the samples. Post curing weight was determined to calculate binder add-on.

The following tests were performed on the binder or cured treated filter paper:

"Add on" is the wt. % based on filter sheet weight of binder solids retained on the treated filter paper sheet after curing. All sheets had about 20 wt. % of binder add-on.

Tensile Testing: The cured sheets were cut into 2.56 cm (1 inch) (cross machine direction) by 10.24 cm (4 inch) (machine direction) test strips and tested for tensile strength in the machine direction in a Thwing-Albert Intelect 500 tensile tester (Thwing-Albert Instrument Co, West Berlin, N.J.). The fixture gap was 5.12 cm (2 inches) and the pull rate was 2.56 cm (1 inches)/minute. Cured, binder treated filter paper test strips were tested either "as is" (dry tensile) or immediately after a 10 minutes soak in water at 85 C (30 min wet tensile.) Tensile strengths were recorded as the peak force measured during parting. Data reported are averages of seven test strips Retention: Is the % retention of wet tensile strength over dry tensile strength. At 150° C., a 30% retention is acceptable; at 170° C., a 35% retention is acceptable.

Weight Loss Upon Cure was measured independently of tensile data by curing 0.6 grams at 30% solids (0.18 g) binder solution in an oven for 30 minutes at 150° C. Weight Loss is the 100% minus the percentage of the material weighed after curing compared to the 0.18 grams of solid charged. Three trials of each example is measured and then averaged; the average is reported.

Dimensional Mechanical Analysis (DMA) was run by putting 0.5 g of 30% solids (0.15 g) binder solution on two strips of Whatman GF/B filter paper. The two strips were then placed in a TA instruments DMA (Q800 DMA TA Instruments New Castle, DE) where it was heated from 30 to 250° C. at 4° C./minute. The results show the cure energy requirement for building modulus.

TABLE 1

Tensile Strength Data at Cure Temp of 150° C.

| Example | Cure Time (s) | Polysaccharide | Dry Strength (N) | Hot-Wet Strength (N) | Add-on | Weight Loss Upon Cure |
|---|---|---|---|---|---|---|
| 1 | 60 | 20% Maltodextrin[1] | 71.16 | 22.56 | 19% | 22.1% |
| 2 | 180 | 20% Maltodextrin[1] | 65.37 | 21.36 | 20% | 22.1% |
| 3* | 60 | 20% 43DE | 60.08] | 16.55 | 19% | 31.9% |
| 4* | 180 | 20% 43DE | 65.15 | 24.21 | 20% | 31.9% |
| 5* | 60 | 20% 63DE | 56.92 | 17.13 | 19% | 33.3% |
| 6* | 180 | 20% 63DE | 68.53 | 23.23 | 19% | 33.3% |
| 7* | 60 | 0% (80% Dextrose)[2] | 49.75 | 19.05 | 19% | 35.4% |
| 8* | 180 | 0% (80% Dextrose)[2] | 58.03 | 18.29 | 18% | 35.4% |
| 9* | 60 | 80% Malto[1] | 41.65 | 0 | 22% | 5.6% |
| 10* | 180 | 80% Malto[1] | 48.19 | 0.71 | 24% | 5.6% |

*Comparative;
[1]DE value is 10;
[2]DE value ~100

Example 2

Weight Loss Upon Cure in Simple Formulations

In Example 2, replacement of 20 wt., based on total solids, of the dextrose with maltodextrin in a binder containing 20 wt. %, based on total solids, of HMDA and the remainder of dextrose dramatically reduced the binder weight loss upon cure from 35% to 22% (comare Examples 7 and 8) at a cure temp of 150° C. for 30 minutes without significantly impairing the tensile strength properties of the final product at similar binder add-on (compare Examples 7 and 8). As a result, nearly 40% less binder is used. In contrast, a 43 DE corn syrup only reduced weight loss upon cure by 2.5% (see comparative Examples 3 and 4).

TABLE 2

Tensile Strength Data at Cure Temp of 170° C

| Ex. # | Cure Time (s) | Polysaccharide | Dry Strength (N) | Hot-Wet Strength (N) | Add-on | Retention | Weight Loss Upon Cure |
|---|---|---|---|---|---|---|---|
| 11 | 60 | 20% Malto[1] | 65.95 | 18.78 | 20% | 28.5% | 22.1% |
| 12 | 180 | 20% Malto[1] | 62.48 | 21.18 | 19% | 33.9% | 22.1% |
| 13 | 60 | 30% Malto[1] | 66.75 | 24.16 | 21% | 36.2% | 19.4% |
| 14 | 180 | 30% Malto[1] | 81.03 | 29.19 | 21% | 36.0% | 19.4% |
| 15 | 60 | 40% Malto[1] | 64.08 | 19.27 | 21% | 30.1% | 15.8% |
| 16 | 180 | 40% Malto[1] | 70.09 | 22.21 | 21% | 31.7% | 15.8% |
| 17 | 60 | 20% 26DE | 76.72 | 30.08 | 20% | 39.2% | 25.7% |
| 18 | 180 | 20% 26DE | 75.56 | 33.69 | 20% | 44.6% | 25.7% |
| 19* | 60 | 20% 43DE | 68.35 | 24.21 | 19% | 35.4% | 31.9% |
| 20* | 180 | 20% 43DE | 63.72 | 25.01 | 19% | 39.3% | 31.9% |
| 21* | 60 | 20% 63DE | 65.32 | 24.83 | 19% | 38.0% | 33.3% |
| 22* | 180 | 20% 63DE | 60.79 | 27.10 | 17% | 44.6% | 33.3% |
| 23* | 60 | 0% (80% Dextrose)[2] | 65.59 | 22.74 | 18% | 34.7% | 35.4% |
| 24* | 180 | 0% (80% Dextrose)[2] | 66.04 | 28.88 | 17% | 43.8% | 35.4% |
| 25* | 60 | 80% Malto[1] | 52.15 | 0 | 23% | 0.0% | 5.65% |
| 26* | 180 | 80% Malto[1] | 58.92 | 1.25 | 23% | 2.1% | 5.65% |

*Comparative;
[1]DE value is 10;
[2]DE value ~100

As shown in Tables 1 and 2, above, compositions of comparative Examples 9-10 and 25-26 with 80 wt. % solids maltodextrin provide no wet tensile strength. Of the compositions shown in Table 2, above, all provide acceptable tensile properties after a 180 second cure or tensile properties nearly acceptable (Examples 15 and 16). All malto examples 11 to 16 in Table 2 give excellent improvement in weight loss upon cure without impairing tensile properties. The 26 DE corn syrup in Examples 17 and 18 provides 25.75 weight loss vs. 35.4% weight loss upon cure in control Examples 23 and 24, a nearly 30% improvement. When compared to Examples 19 and 20 with the 43 DE corn syrup, the 26 DE corn syrup in Examples 17 and 18 well more than doubled the reduction in weight loss upon cure, a nearly 20% overall improvement in such weight loss based on the total weight of the binder.

TABLE 3

Weight Loss Upon Cure Data
(All materials shown in wt. %, based on total solids)

| Example[1] | HMDA | Dextrose | Maltodextrin | Corn Syrup (43 DE) | Corn Syrup (63 DE) | Weight Loss Upon Cure |
|---|---|---|---|---|---|---|
| 27* | 21.25 | 63.75 | 5 | | | 27.7% |
| 28 | 20 | 60 | 10 | | | 25.8% |
| 29 | 18.75 | 56.25 | 15 | | | 24.5% |
| 30 | 17 | 51 | 22 | | | 21.6% |
| 31 | 16.25 | 48.75 | 25 | | | 20.8% |
| 32 | 15.5 | 46.5 | 28 | | | 19.7% |
| 33* | 17 | 51.0 | | 22 | | 25.8% |
| 34* | 17 | 45.8 | | 27.2 | | 25.0% |
| 35* | 16 | 41.9 | | 32.1 | | 24.1% |
| 36* | 15 | 38.0 | | 37 | | 23.6% |
| 37* | 17 | 51 | | | 22 | 26.4% |

TABLE 3-continued

Weight Loss Upon Cure Data
(All materials shown in wt. %, based on total solids)

| Example[1] | HMDA | Dextrose | Maltodextrin | Corn Syrup (43 DE) | Corn Syrup (63 DE) | Weight Loss Upon Cure |
|---|---|---|---|---|---|---|
| 38* | 17 | 38.6 | | | 34.4 | 24.2% |
| 39* | 16 | 33.4 | | | 40.6 | 23.4% |
| 40* | 15 | 28.2 | | | 46.8 | 22.4% |
| 41* | 18 | 71.8 | 0 | | | 29.7% |

[1]Diammonium phosphate at 10 wt. % solids is included in all formulations;
*comparative As shown in Table 3, above, the maltodextrin containing compositions of Examples 28 to 32 dramatically lower the loss on ignition (LOI) of the binder in use, especially compared to the control Example 41. The LOI achieved by the preferred concentrations of maltodextrin of 25 wt. % or less based on total solids in Examples 28-31 would not have been achieved with the higher DE value polysaccharides in Examples 33-40. For example, the same amount of maltodextrin in Example 30 (22%) lowers LOI from 29.7% to 21.6%, almost a 30% decrease, whereas the corn syrup (DE 43) in Example 33 lowers the LOI only half as much and the corn syrup (DE 63) in Example 37 lowers the LOI not half as much. Similarly, 10 wt. %, based on total solids, of maltodextrin in Example 28 lowers LOI as much as 22 wt. %, based on total solids, of corn syrup DE 43 in Example 33 and more than 22 wt. %, based on total solids, of corn syrup DE 63 in Example 37.

TABLE 4

DMA Results

| Example | Polysaccharide | HMDA | Dextrose | Up Turn Temp (° C.) | Peak Modulus Temp (° C.) |
|---|---|---|---|---|---|
| 44* | None (Control) | 20% | 80% | 114 | 212 |
| 45* | 20% DE63 | 20% | 60% | 114 | 210 |
| 46* | 20% DE43 | 20% | 60% | 111 | 145 |
| 47 | 20% DE26 | 20% | 60% | 104 | 139 |
| 48 | 20% Malto | 20% | 60% | 110 | 141 |
| 49 | 30% Malto | 20% | 50% | 108 | 139 |
| 50 | 40% Malto | 20% | 40% | 100 | 126 |

*comparative.

As shown in Table 4, above, maltodextrin in the compositions of Examples 47 to 50 and DE 26 corn syrup in the compositions of Example 47 both provide early dry strength as shown by the temperature at which the binder treated filter paper strips reach their peak modulus. This results in further savings in use from lower energy requirement to achieve dry strength.

We claim:

1. An aqueous thermosetting binder composition comprising i) one or more reducing sugar; ii) one or more diprimary diamine or poly(primary amine), wherein the weight ratio of the total diprimary diamine or poly(primary amine) solids to total reducing sugar solids ranges from 1.2:1 to 0.12:1; iii) from 7 to 45 weight percent, based on total solids, of one or more polysaccharide having a dextrose equivalent value of from 5 to 30.

2. The aqueous thermosetting binder composition as claimed in claim 1, wherein the one or more reducing sugar is dextrose.

3. The aqueous thermosetting binder composition as claimed in claim 1, wherein the one or more diprimary diamine or poly(primary amine) is a diprimary diamine.

4. The aqueous thermosetting binder composition as claimed in claim 3, wherein the one or more diprimary diamine is hexamethylene diamine.

5. The aqueous thermosetting binder composition as claimed in claim 1, wherein the one or more polysaccharide has a dextrose equivalent value of from 7 to 23.

6. The aqueous thermosetting binder compositions as claimed in claim 5, wherein the one or more polysaccharide is a maltodextrin.

7. The aqueous thermosetting binder composition as claimed in claim 1, wherein the one or more polysaccharide is present in the amount of from 10 to 30 weight percent based on total solids.

8. The aqueous thermosetting binder composition as claimed in claim 1, further comprising one or more stabilizer.

9. A method of using the aqueous thermosetting binder composition as claimed in claim 1 comprising:
applying the binder composition to or mixing it with a substrate and then heating the thus treated substrate or mixture to cure the binder at from 100 to 400° C.

10. A treated fiber matt containing a cured binder resulting from applying the aqueous thermosetting binder composition of claim 1 to a fiber matt.

* * * * *